Feb. 4, 1969    J. F. MEYER ET AL    3,425,866
ELECTRICAL CONDUCTOR COATED WITH POLYESTER-POLYIMIDE
INNER LAYER AND POLYESTER OUTER LAYER
Filed Feb. 13, 1967

INVENTORS
JOHN F. MEYER
HOWARD E. SHEFFER
EDMUND J. ZALEWSKI

Cushman, Darby & Cushman
ATTORNEYS

United States Patent Office 3,425,866
Patented Feb. 4, 1969

3,425,866
ELECTRICAL CONDUCTOR COATED WITH POLYESTERPOLYIMIDE INNER LAYER AND POLYESTER OUTER LAYER
John F. Meyer, Schenectady, Howard E. Sheffer, Burnt Hills, N.Y., and Edmund J. Zalewski, Rotterdam, N.Y., assignors to Schenectady Chemicals, Inc., Schenectady, N.Y., a corporation of New York
Continuation-in-part of applications Ser. No. 457,474, May 20, 1965, and Ser. No. 528,865, Feb. 21, 1966. This application Feb. 13, 1967, Ser. No. 633,313
U.S. Cl. 117—218                    13 Claims
Int. Cl. H01b *3/38, 3/42*

ABSTRACT OF THE DISCLOSURE

A polyester-polyimide is prepared from (1) tris (2-hydroxyethyl) isocyanurate, (2) a polycarboxylic acid, e.g., terephthalic acid or isophthalic acid, (3) an aromatic diamine, e.g., oxydianiline or methylene dianiline and (4) an aromatic carboxylic anhydride containing at least one additional carboxyl group, e.g., trimellitic anhydride or pyromellitic anhydride. The polyester-polyimide is employed to coat an electrical conductor and there can be applied to the electrical conductor a second continuous coating of polyethylene terephthalate.

---

This application is a continuation-in-part of application Ser. No. 457,474, filed May 20, 1965, and application Ser. No. 528,865, filed Feb. 21, 1966 the latter application now abandoned.

Novel polyester-polyimides suitable for use as wire coatings are disclosed in our parent application Ser. No. 457,474.

It is an object of the present invention to prepare an electrical conductor coated with such a polyester-polyimide having improved properties.

A more specific object is to prepare such a coated electrical conductor having improved abrasion resistance.

Another object is to prepare such a coated electrical conductor having improved heat shock properties.

An additional object is to prepare such an electrical conductor having improved heat aging properties.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by coating an electrical conductor with a polyester-polyimide containing tris (2-hydroxyethyl) isocyanurate (THEI) as a significant portion of the polyester and then applying a coating of a linear polyester formed by the reaction of an aromatic dicarboxylic acid and a glycol, preferably polyethylene terephthalate.

It is particularly surprising that an improvement in heat aging is noted when using the linear polyethylene terephthalate topcoat.

Figure 1:
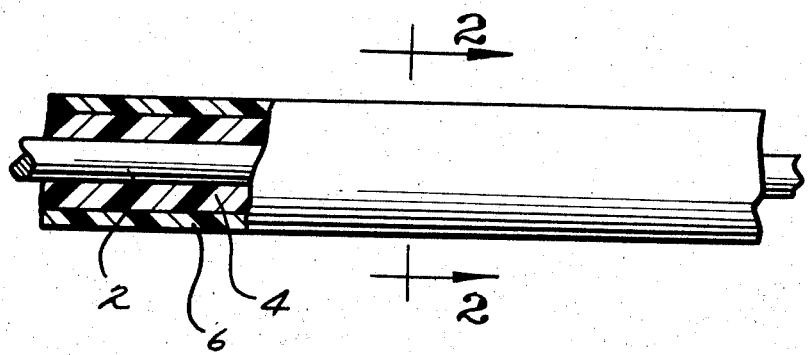
Figure 2:
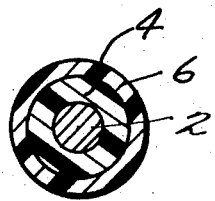

The invention will be understood best in connection with the drawings wherein:

FIGURE 1 is a view partially broken away in section showing a wire coated according to the invention; and FIGURE 2 is a sectional view taken along the line 2—2 of FIGURE 1.

In the drawings the thickness of the coatings is greatly exaggerated since in actual practice the coatings are much thinner than the wire.

Referring more specifically to the drawings, there is provided a copper wire 2 having a first coating 4 of a polyester-polyimide 4 and a second coating 6 of polyethylene terephthalate.

The polyimide can be preformed and then the polyester forming components added or all of the components can be added together or the polyester forming ingredients can be added first.

The polyimide can provide from 5 to 50% of the total of polyimide and polyester groups. Preferably the polyimide is 30 to 35% of the total. Good results have also been obtained where the polyimide was 10 to 20% of the total of the polyimide and polyester.

Unless otherwise indicated, all parts and percentages are by weight.

As the polyimide forming components there can be used (a) anhydrides such as trimellitic anhydride, pyromellitic dianhydride, benzophenone 2,3-2',3'-tetracarboxylic dianhydride, 2,3,6,7-naphthalene dianhydride and 3,3',4,4'-diphenyl tetracarboxylic dianhydride and (b) polyamines, preferably aromatic amines, including methylene dianiline, benzidine, 3,3'-diaminodiphenyl, 1,4-diamino naphthalene, p-phenylene diamine, α,ω-nonamethylene diamine, 4,4'-diaminodiphenyl ether, 1,7-dimethylheptamethylene diamine, 4,4'-diaminodiphenyl ketone, bis-(4-aminophenyl)-α,α'-p-xylene, m-phenylene diamine, xylene diamine, hexamethylene diamine, ethylene diamine, 4,4'-dicyclohexylmethane diamine, diaminodiphenyl sulfone. The preferred diamines are first methylene dianiline and second 4,4'-diaminodiphenylether hereinafter called oxydianiline. Reactants (a) and (b) are usually employed in an amount of approximately 2 moles of (a) per mole of (b) to form the imide-acid. Generally, 1.92 to 2.08 moles of the anhydride are used per mole of diamine although the anhydride can be used in excess. The reaction product of two moles of trimellitic anhydride and 1 mole of oxydianiline or methylene dianiline has the formula

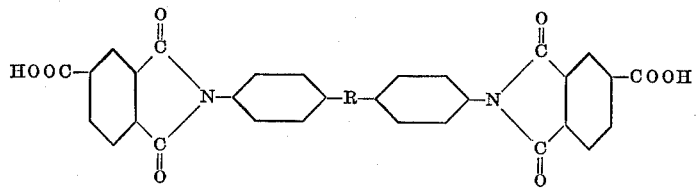

where R is O in the case of oxydianiline or $CH_2$ in the case of methylenedianiline.

There can also be employed an excess of the diamine in order to form a poly(esteramidimide). Thus, there can be used 1.98 moles of methylene dianiline with 1.80 moles of trimellitic anhydride (an excess of 2.16 equivalents of the amino groups over the anhydride groups). A larger excess of diamine can be used if desired, e.g., an excess of 2.5 equivalents of amine groups over anhydride groups.

The polyester forming ingredients include tris (2-hydroxyethyl) isocyanurate as the alcohol and terephthalic acid or isophthalic acid as the acid. The preferred acid is terephthalic acid.

A portion of the tris (2-hydroxyethyl) isocyanurate up to 80 equivalent percent of the total polyhydric alcohol can be replaced by another polyhydric alcohol such as ethylene glycol, glycerine, pentaerythritol, 1,1,1-trimethylolethane, 1,1,1- trimethylolpropane, sorbitol, mannitol, dipentaerythritol, butanediol-1,4, trimethylene glycol, propylene glycol, pentanediol-1,5, neopentylene glycol, butene-2-diol-1,4, butyne - 2-diol-1,4,2,2,4,4-tetramethyl-1,3-cyclobutanediol, hydroquinone dibeta hydroxyethyl ether and 1,4-cyclohexane dimethanol. Preferably, at least 50 equivalent percent of the total polyhydric alcohol is the THEI.

When a modifying alcohol is employed, preferably, it is a dihydric alcohol. Preferably, the only alcohol present containing at least three hydroxyl groups is the tris (2-hydroxyethyl) isocyanurate.

A portion of the terephthalic acid or isophthalic acid up to 50 equivalent percent of the total acid can be replaced by another polycarboxylic acid, e.g., adipic acid, ortho phthalic anhydride, hemimellitic acid, trimesic acid, trimellitic acid, succinic acid, tetrachlorophthalic anhydride, hexachloroendomethylene tetrahydrophthalic acid, maleic acid, sebacic acid. If the modifying acid has only two carboxyl groups and these are situated in imide forming position, then the modifying acid is preferably added to the reaction mixture after the reaction of trimellitic anhydride (or other anhydride) with the methylene dianiline (or other diamine).

It should be realized, of course, that any free acid or anhydride groups on the polyimide will also take part in the ester forming reaction.

The terephthalic acid and isophthalic acid can also be used in admixture with each other.

The terephthalic acid or isophthalic acid is reacted as such or in the form of a mono or dialkyl ester, e.g., dimethyl terephthalate, dimethyl isophthalate, diethyl terephthalate, dibutyl terephthalate, monomethyl terephthalate, monoethyl isophthalate, or in the form of an acyl halide, e.g., terephthaloyl chloride, isophthaloyl chloride.

In making the polyester there preferably should be an excess of alcoholic groups over acid groups. Normally the number of hydroxyl groups on the alcohol component is 1 to 1.6 times the total number of carboxyl groups on the acid components.

The polyester wire enamel is usually modified by incorporation of 1 to 25% of a polyisocyanate based on the weight of the total of the polyisocyanate and polyester and/or by the incorporation of 0.01 to 10% of an alkyl titanate based on the total solids of the enamel.

As the polyisocyanate there can be used 2,4-tolylene diisocyanate, 2,6-tolylene diisocyanate, m-phenylene diisocyanate, 1,6-hexamethylene diisocyanate, the cyclic trimer of 2,6-tolylene diisocyanate, the trimer of 4,4'-diphenyl methane diisocyanate, 1,3,5-triisocyanato benzene, blocked isocyanates such as the reaction product of 3 mols of mixed 2,4- and 2,6-tolylene diisocyanate with trimethylol propane wherein the isocyanate groups are blocked by esterification with phenol (Mondur S), and Mondur SH wherein the mixed cyclic trimers of 2,4- and 2,6-tolylene diisocyanates have the three free isocyanate groups blocked by esterification with m-cresol. Other examples of suitable polyisocyanates, including blocked isocyanates are given in Sheffer et al. Patent 2,982,754 in column 1, line 41, to column 3, line 7.

Typical examples of suitable alkyl titanates include tetraisopropyl titanate, tetramethyl titanate, tetrabutyl titanate, tetrahexyl titanate and tetrapropyl titanate.

The polyester-polyimide forming reaction is normally carried out in the presence of the same solvents used to form the wire enamel. Thus, there can be used N-methyl pyrrolidone, dimethyl acetamide, dimethyl formamide, dimethyl sulfoxide, N-methyl caprolactam, xylene, cresylic acid, p-cresol, m-p-cresol mixture, dimethyl sulfone or the like. Mixtures of solvents can be used, e.g., blends of N-methyl pyrrolidone with dimethyl acetamide and/or dimethyl formamide, a mixture of N-methyl pyrrolidone, dimethyl acetamide and toluene (6:3:4), N-methyl pyrrolidone and xylene.

Both aliphatic and aromatic hydrocarbons can be used as diluents, e.g., aromatic naphthas such as Solvesso No. 100, toluene, xylene, octane, decane, dodecane and tetradecane. The addition of the higher boiling aliphatic hydrocarbons as part of the solvent improve the smoothness of the wire enamel.

Sometimes a metal drier is added in an amount of 0.2 to 1.0% metal based on the total solids in the enamel. Typical metal driers include zinc octoate, cadmium linoleate, zinc resinate, calcium octoate, cadmium naphthenate and zinc naphthenate.

There is preferably included in the wire enamel 1 to 5% based on the total solids of a melamine-formaldehyde resin or a phenolic resin such as phenol-formaldehyde, cresol-formaldehyde or xylenol-formaldehyde. The use of the phenolic resin is preferred over the melamine resin.

The polyester-polyimide is employed as a wire enamel while in solution in a solvent syste msuch as those specified above. It is applied to an electrical conductor, e.g., copper, silver or stainless steel wire in conventional fashion, e.g., by the "free dip" method or the "die application" procedure both of which procedures are described in Meyer Patent No. 3,201,276. Wire speeds of 15 to 36 feet/min. can be used with wire tower temperatures of 250 to 800° F., usually with a final temperature of above 500° F. The build up of the polyester-polyimide enamel on the wire can be 0.0005 to 0.010 inch, preferably 0.002 to 0.004 inch using No. 18 wire. The wire is passed through the enamel one or more times until the desired buildup is obtained. (The buildup is the total increase in diameter over the bare wire diameter.)

The linear polyethylene tetraphthalate topcoat can be applied from any convenient solvent system. The preferred solvent systems are those set forth in Sheffer Patent No. 3,141,859.

Thus, there can be used a dispersion of polyethylene terephthalate in a solvent comprising a chlorophenol, e.g., o-chlorophenol, m-chlorophenol and p-chlorophenol, or an alkylated chlorophenol such as p-chloro-m-cresol, 4-chloro-sec. butyl phenol and p-chlorothymol or a mixture of these chlorophenols; together with a cresol, e.g., o-cresol, m-cresol, p-cresol, cresylic acid or a mixture of m-cresol and p-cresol. A portion of the cresol can be replaced by phenol.

Among the preferred solvent compositions for the polyethylene terephthalate are those containing at least one chlorophenol, at least one cresol and phenol, e.g., a mixture of p-chlorophenol, o-cresol and phenol. Another preferred solvent mix comprises p-chlorophenol and cresylic acid while a third preferred mix contains p-chlorophenol and m-p-cresol.

Cresylic acid is defined in Bennett's Concise Chemical and Technical Dictionary (1947), as a mixture of o-, m-, and p-cresols having a boiling range of 185° C. to 230° C.

When dissolving linear polyethylene terephthalate in the preferred solvent mixture, the chlorophenol can be employed in the range of 30 to 50% of the total solvent, the phenol in the range of 25 to 50% and the cresol in the range of 10 to 35%. If, as stated previously, a cresol is substituted for the phenol, the total cresol can be employed in an amount up to 70%.

As previously indicated, the undercoat of polyester-polyamide is built up to 0.0005 to 0.010 inch, preferably 0.002 to 0.004 inch. The overcoat of the polyethylene terephthalate is built up to build between 0.0005 and 0.003 inch, preferably not over 0.002 inch. Normally, the over-all build of the bottom and topcoats (i.e., polyester-polyimide together with the polyethylene terephthalate) is between 0.002 and 0.013 inch and preferably between 0.003 and 0.006 inch.

EXAMPLE 1

To 192 grams (1 mol) of trimellitic anhydride in 300 cc. of N-methyl pyrrolidone there were added 100 grams (0.5 mol) of oxydianiline in 300 cc. of N-methyl pyrrolidone. An exothermic reaction took place and a clear solution was obtained. Then there was added 99 grams of tris (2-hydroxyethyl) isocyanurate, 165 grams of ethylene glycol, 388 grams of dimethyl terephthalate and 0.0345 gram of litharge (catalyst). The mixture was heated to 440° F. and an orange solid became suspended in the mixture. Heating was continued until the mixture became clear (48–72 hours). The product was suitable for use as a wire enamel, e.g., for copper wire. To the final wire enamel solution there was added as a thinner a mixture of 40% p-chlorophenol, 40% phenol and 20% o-cresol to reduce the total solids to 25% and get a viscosity of W (Gardner-Holdt). This product also could be coated on wire, e.g., by the die application procedure using No. 18 AWG copper wire and passing the coated wire through a wire tower at 750° F. at 27 feet//min.

EXAMPLE 2

To 192 grams of trimellitic anhydride in 150 grams of N-methyl pyrrolidone at 200° F. there was slowly added a solution of 100 grams of oxydianiline in 150 grams of N-methyl pyrrolidone. There was then added a mixture of 254 grams of dimethyl terephthalate, 103 grams of ethylene glycol, 120 grams of tris (2-hydroxyethyl) isocyanurate, 50 grams of xylene and 0.15 gram of litharge. The temperature was increased over a period of 24 hours to 440° F., while methanol and xylene distilled off. When the viscosity of the batch was M at 21% solids in cresylic acid, 1800 grams of cresylic acid were added to give a viscosity of U ¾ measured at 24% solids.

Finally, this polyester-polyimide resin solution was mixed in the following fashion:

840 grams of the polyester-polyimide at 24% solids
8 grams tetraisopropyl titanate
56 grams of 40% solution of Mondur SH in cresylic acid
25 grams of phenol-formaldehyde resin at 40% solids in cresylic acid After the other ingredients were added to the polyester-polyimide the mixture was heated to 250° F. and cooled. It was then run on copper wire in the wire tower at 750° F. in conventional fashion to give an enameled wire which had good electrical properties.

EXAMPLES 3–8

The procedures followed in Examples 3–8 were identical with those in Example 2. Half the N-methyl pyrrolidone was added with the trimellitic anhydride and the balance with the methylene dianiline or oxydianiline.

All of the polyester-polyimide of Examples 3–8 were mixed with tetraisopropyl titanate, Mondur SH and phenol-formaldehyde resin to give wire enamels having the same proportions of these materials as in Example 2. These enamels were then used to coat copper wire as in Example 2. When a topcoat was employed, it was polyethylene terephthalate.

| | Example | | | | | |
|---|---|---|---|---|---|---|
| | 3 | 4 | 5 | 6 | 7 | 8 |
| Trimellitic anhydride | 768 | 384 | 288 | 192 | 192 | 96 |
| N-methyl pyrrolidone | 800 | 600 | 400 | 300 | 300 | 200 |
| Methylene dianiline | 396 | 199 | 148.5 | | | |
| Oxydianiline | | | | 100 | 100 | 50 |
| Dimethyl terephthalate | 1,016 | 766 | 1,020 | 254 | 388 | 340 |
| Ethylene glycol | 416 | 260 | 282 | 103 | 130 | 94 |
| Tris(2-hydroxyethyl) isocyanurate | 480 | 396 | 540 | 120 | 198 | 180 |
| Xylene | 200 | 200 | 300 | 50 | 100 | 100 |
| Litharge | 0.9 | 0.6 | 0.9 | 0.15 | 0.3 | 0.3 |
| Properties Without Topcoat: | | | | | | |
| Mandrel after Snap | 2X | 4X | 2X | 2X | 2X | 2X |
| Heat shock 15% stretch, 200° C | 1X | | (¹) | 3X | 5X | 5X |
| Cut through temp. ° C | 300 | | 310 | 312 | 300 | 303 |
| AIEE No. 57 Heat Life 260° C | 122 | | 465 | 170 | 170 | 108 |
| AIEE No. 57 Heat Life 240° C | 461 | | 816 | | >2,141 | |
| Properties With Topcoat: | | | | | | |
| Mandrel after Snap | 2X | | | 2X | | 2X |
| Heat shock 15% stretch 200° C | 1X | | | 1X | | 1X |
| Heat shock 15% stretch 250° C | | | | 4X | | |
| Cut through temp., ° C | 270 | | | 308 | | 310 |
| AIEE No. 57 Heat Life 260° C | 170 | | | 273 | | 320 |
| AIEE No. 57 Heat Lie 240° C | >1,579 | | | | | |

¹ Over 5X.

EXAMPLES 9–11

The procedures were carried out exactly as in Examples 2–8 except that in Example 11 the order of adding the ingredients was modified so that the methylene dianiline was the last material added to the pot (i.e., the polyimide was not formed prior to adding the polyester forming materials).

| | Example | | |
|---|---|---|---|
| | 9 | 10 | 11 |
| Trimellitic anhydride | 768 | 192 | 192 |
| Cresylic acid | | | 160 |
| N-methyl pyrrolidone | 800 | 160 | |
| Methylene dianiline | 396 | 99 | 99 |
| Dimethyl terephthalate | 1,016 | 254 | 254 |
| Ethylene glycol | 416 | 60 | 60 |
| Tris(2-hydroxyethyl) isocyanurate | 480 | 240 | 240 |
| Xylene | 200 | | |
| Litharge | 0.9 | 0.15 | 0.15 |

The polyester-polyimides of Examples 1–11, as indicated, can all be applied to an electrical conductor and then used with a polyethylene terephthalate topcoat. As shown in connection with Examples 3, 6 and 8, there is a significant improvement in heat aging as shown by the increased AIEE No. 57 Heat Life at 260° C. and at 240° C. There also is an improvement in Heat shock 15% stretch 200° C.

EXAMPLE 12

| | Pounds |
|---|---|
| Cresylic acid (solvent) | 2,080 |
| Ethylene glycol | 643 |
| Tris (2-hydroxyethyl) isocyanurate | 2,573 |
| Trimellitic anhydride | 1,661 |
| Methylene dianiline | 854 |
| Terephthalic acid | 1,882 |
| p-Toluene sulfonic acid (catalyst) | 3,312 |

The above materials were charged into a stainless steel, 2,000 gallon reaction kettle fitted with an agitator, thermowell and fractionating column. The batch was heated over a 15 hour period to 440° F. and held at that temperature until a 42% solids check out in cresylic acid was Z4+ viscosity. The batch was then reduced with a mixture of 5,224 pounds of cresylic acid and 3,904 pounds of Solvesso 100. The final constants of the polyester-polyimide solution were viscosity Z2+, solids 40.5%, sp. gr. 1.115.

10,227 pounds of the polyester-polyimide solution were mixed with 2,805 pounds of cresylic acid and 1,491 pounds of Solvesso 100. The mixture was heated to 120–130° F. and 182 pounds of tetraisopropyl titanate was added over a 15 minute period. Then 1,125 pounds of Mondur SH (40% solution in cresylic acid) and 482 pounds of 709 phenolic resin (m-p-cresol-formaldehyde resin 40% solution in cresylic acid) were added and the batch heated to 245–250° F. in 75 minutes. The temperature was held at 250° F. for 2 hours and then the mixture was cooled. The batch was reduced with a mixture of 715 pounds of cresylic acid and 385 pounds of Solvesso 100. The final constants of the wire enamel thus prepared were: viscosity R, solids 29.6%, sp. gr. 1.055.

A No. 18 copper wire was coated with the enamel thus prepared using the die application procedure at a wire speed of 30 ft. per minute at a wire tower temperature of 750° F. Six passes of the wire through the solution and tower were employed and the total build up of enamel on the wire was about 0.003 inch (3 mils). A second conductor was similarly coated except that only 5 passes of the wire through the solution and tower were employed. The conductor was then given an overcoat by a single pass through a solution prepared from 3,300 pounds of p-chlorophenol, 5,217 pounds of Koppers 70% phenol (70% phenol, 30% cresol) and 1,461 pounds of Dacron fiber (linear polyethylene terephthalate).

The comparative properties of the conductors coated according to Example 12 are given in the following table:

TABLE 1

| | Heat shock 15% stretch at 200° C. | Emerson Scrape | AIEE No. 57 Heat Life | |
|---|---|---|---|---|
| | | | 260° C. | 280° C. |
| No Overcoat | 1X 40% pass, 2X 700% pass, 3X 100% pass | 22 | 564 hrs | 131 hrs. |
| Overcoat | 1X 100% pass, 2X 100% pass, 3X 100% pass | 30 | 1,000 hrs | 168 hrs. |

In the table 1X indicates 1X diameter.

EXAMPLE 13

Using the same procedure as in Example 3 there was employed the following mixture to prepare the polyester-polyimide:

| | | |
|---|---|---|
| Trimellitic anhydride | grams | 768 |
| Methylene dianiline | do | 396 |
| N-methyl pyrrolidone | do | 800 |
| Dimethyl terephthalate | do | 1,016 |
| Ethylene glycol | do | 416 |
| Tris (21hydroxyethyl) isocyanurate | do | 480 |
| Litharge | gram | 0.90 |
| Xylol | cc | 200 |

To 1992 grams of the polyester-polyimide solution thus prepared there were added 507 grams of Solvesso 100, 94 grams of a 40% solution of m-p-cresol-formaldehyde resin in cresylic acid, 207 grams of 40% solution of Mondur SH in a solvent consisting of 65% cresylic acid and 35% Solvesso 100, and 30 grams of tetraisopropyl titanate and the mixture heated to 250° F. and cooled. The wire enamel thus produced had a viscosity of H–I and 30% solids. It was applied to No. 18 copper wire in an identical manner with that described in Example 12 at speeds of 30 ft./min. and 33 ft./min. At each speed there was made a run without a topcoat and another run using the same polyethylene terephthalate solution as in Example 12 to provide a topcoat. AIEE No. 57 Heat Life tests were made with the following results:

| | Speed | 220° C. | 240° C. |
|---|---|---|---|
| No Topcoat | 30 ft./min | 2,838 hours | 461 hours. |
| | 33 ft./min | 1,056 hours | 264 hours. |
| Topcoat | 30 ft./min | 4,260 hours | 1,435 hours. |
| | 33 ft./min | 5,500 hours | 1,805 hours. |

EXAMPLE 14

| | Grams |
|---|---|
| Trimellitic anhydride | 288 |
| Oxydianiline | 150 |
| N-methyl pyrrolidone | 600 |
| Dimethyl terephthalate | 1020 |
| Ethylene glycol | 282 |
| Tris (2-hydroxyethyl) isocyanurate | 540 |
| Litharge (PbO) | 0.9 |
| Xylol | 300 |

The polyester-polymide was prepared in the same manner as in Example 3. To 2144 grams of the polyester-polyimide solution thus prepared there were added 360 grams of cresylic acid, 840 grams of Solvesso 100, 124 grams of a 40% solution of m-p-cresol-formaldehyde resin in cresylic acid, 280 grams of a 40% solution of Mondur SH in a solvent consisting of 65% cresylic acid and 35% Solvesso 100, and 40 grams of tetraisopropyl titanate and the mixture heated to 250° F. and cooled. The wire enamel thus produced had a viscosity of W+ and 28.4% solids. It was applied to No. 18 copper wire in an identical manner with that described in Example 12 at speeds of 30 ft./min. and 33 ft./min. At each speed there was made a run without a topcoat and another run using the same polyethylene terephthalate solution as in Example 12 to provide a topcoat. AIEE No. 57 Heat Life tests were made with the following results:

| | Speed | 220° C. | 240° C. | 260° C. |
|---|---|---|---|---|
| No Topcoat | 30 ft./min | 5,380 hrs | 2,141 hrs | 118 hrs. |
| | 33 ft./min | 3,077 hrs | 1,349 hrs | 98 hrs. |
| Topcoat | 30 ft./min | 6,012 hrs | 2,201 hrs | 295 hrs. |
| | 33 ft./min | 5,672 hrs | 1,459 hrs | 343 hrs. |

Example 15

| | Grams |
|---|---|
| N-methyl pyrrolidone | 28,800 |
| Trimellitic anhydride | 34,600 |
| Methylene dianiline | 17,800 |
| Xylol | 9,000 |
| Ethylene glycol | 10,800 |
| Dimethyl terephthalate | 45,800 |
| Tris (2-hydroxyethyl) isocyanurate | 43,200 |
| Litharge | 41 |

The polyester-polyimide was prepared in a 75 gallon pilot plant kettle in a manner similar to that in Example 12. The mixture was thinned with 81,000 grams of cresylic acid and 59,000 grams of Solvesso 100 to give a product having a viscosity of Z3+ and 41.6% solids.

To 1440 grams of the polyester-polyimide solution thus prepared there were added 60 grams of cresylic acid, 500 grams of Solvesso 100, 24 grams of tetraisopropyl titanate, 75 grams of a 40% solution of m-p-cresol-formaldehyde resin in cresylic acid and 165 grams of a 40% solution of Mondur SH in a solvent consisting of 65% cresylic acid and 35% Solvesso 100 and the mixture heated to 250° F. and cooled. The wire enamel thus produced had a viscosity of D-E and 31% solids. It was applied to No. 18 copper wire in an identical manner with that described in Example 12 at speeds of 30 ft./min. and 33 ft./min. At each speed there was made a run without a topcoat and another run using the same polyethylene terephthalate solution as in Example 12 to provide a topcoat. AIEE No. 57 Heat Life tests were made with the following results:

|  | Speed | 220° C. | 240° C. | 260° C. |
|---|---|---|---|---|
| No Topcoat | 30 ft./min. | 1,254 hrs. | 329 hrs. | 131 hrs. |
|  | 33 ft./min. | 2,547 hrs. | 545 hrs. | 127 hrs. |
| Topcoat | 30 ft./min. | 7,482 hrs. | 1,648 hrs. | 353 hrs. |
|  | 33 ft./min. | 5,957 hrs. | 1,838 hrs. | 233 hrs. |

|  | Example | |
|---|---|---|
|  | 16 | 17 |
| Cresylic acid | 1,612 | 2,100 |
| Trimellitic anhydride | 346 | 355 |
| Methylene dianiline | 178 | 182.6 |
| Terephthalic acid | 392 | 402 |
| Ethylene glycol | 83.4 | 140 |
| Tris(2-hydroxyethyl) isocyanurate | 700.4 | 550 |
| p-Toluene sulfonic acid | 0.75 | |

The procedure followed in Examples 16 and 17 was identical with that in Example 2. Both of the polyester-polyimides of Examples 16 and 17 were mixed with tetraisopropyl titanate, Mondur SH and phenol-formaldehyde resin to give wire enamels having the same proportions of these materials as in Example 2. These enamels were also then used to coat copper wire as in Example 2. The properties of the coated wire were as indicated below:

|  | Example | | | |
|---|---|---|---|---|
|  | 16 | | 17 | |
| Speed of wire during application (ft./min.) | 30 | 33 | 30 | 33 |
| Mandrel after snap | 2X | 2X | 3X | 2X |
| Flex heat aging at 175° F. | (1) | (2) | (1) | (1) |
| Heat shock 15% stretch 200° C. | (3) | (3) | (4) | (4) |
| Cut through ° C. | 362 | 355 | 343 | 341 |
| Emerson scrape test (lbs.) | 24 | 23 | 28 | 30 |

1 >168 hours.
2 >144 hours.
3 O.K. 1X.
4 O.K. 2X.

The coated wire of Examples 16 and 17 also was useful with a second continuous coating of polyethylene terephthalate as a topcoat using the procedure set forth in Example 12.

We claim:
1. An electrical conductor provided with a first continuous coating consisting essentially of a polyester-polyimide wherein at least 20% of the alcohol component of the polyester is tris (2-hydroxyethyl) isocyanurate and a second continuous coating consisting essentially of polyethylene terephthalate.

2. A coated electrical conductor according to claim 1 wherein the polyimide portion of the first continuous coating has a member of the group consisting of benzene and naphthalene rings joined to two carbon atoms of a heterocyclic imide ring having 5 to 6 members in the ring, one of the atoms in the heterocyclic ring being a nitrogen atom and the balance of the atoms of the heterocyclic ring being carbon atoms.

3. A coated electrical conductor according to claim 2 wherein a carboxyl group of the polyimide portion of the molecule is esterified with a polyhydric alcohol from the polyester portion of the molecule.

4. A coated electric conductor according to claim 1 wherein the polyester-polyimide consists essentially of the reaction product of (1) an aromatic diamine, (2) an aromatic carboxylic anhydride containing at least one additional carboxyl group, (3) a member of the group consisting of terephthalic acid and isophthalic acid and (4) a polyhydric alcohol component including at least 20% tris (2-hydroxyethyl) isocyanurate.

5. A coated electrical conductor according to claim 4 wherein 10 to 80% of the polyhydric alcohol component is a dihydric alcohol.

6. A coated electrical conductor according to claim 5 wherein the polyimide groups are 5 to 50% of the total of polyester and polyimide groups.

7. A coated electrical conductor according to claim 6 wherein the anhydride is selected from the group consisting of trimellitic anhydride, pyromellitic anhydride and benzophenone tetracarboxylic dianhydride.

8. A coated electrical conductor according to claim 7 wherein the diamine is selected from the group consisting of oxydianiline and methylene dianiline.

9. A coated electrical conductor according to claim 1 wherein the polyester-polyimide consisting essentially of the reaction product of (1) an aromatic diamine selected from the group consisting of oxydianiline and methylene dianiline, (2) trimellitic anhydride, (3) terephthalic acid and (4) a polyhydric alcohol component including at least 30% tris (2-hydroxyethyl) isocyanurate, any polyhydric alcohol component other than the isocyanurate being a lower alkanediol.

10. A coated electrical conductor according to claim 9 wherein the diamine is methylene dianiline.

11. A coated electrical conductor according to claim 9 wherein said first continuous coating includes an alkyl titanate.

12. A coated electrical conductor according to claim 9 wherein said first continuous coating includes an organic polyisocyanate.

13. A coated electrical conductor according to claim 9 wherein said first continuous coating includes a minor amount of an alkyl titanate, a minor amount of an organic polyisocyanate and a minor amount of a phenol-formaldehyde resin.

References Cited

UNITED STATES PATENTS

| 3,190,770 | 6/1965 | Lavin et al. | 117—218 |
| 3,201,276 | 8/1965 | Meyer et al. | 117—218 |
| 3,306,771 | 2/1967 | Schmidt et al. | 117—218 |
| 3,312,573 | 4/1967 | Sheffer | 117—218 |

WILLIAM D. MARTIN, Primary Examiner.

R. HUSACK, Assistant Examiner.

U.S. Cl. X.R.

117—232

UNITED STATES PATENT OFFICE
CERTIFICATE OF CORRECTION

Patent No. 3,425,866                                              February 4, 1969

John F. Meyer et al.

It is certified that error appears in the above identified patent and that said Letters Patent are hereby corrected as shown below:

Column 7, line 56, "700%" should read -- 70% --.

Signed and sealed this 24th day of March 1970.

(SEAL)
Attest:

Edward M. Fletcher, Jr.                                 WILLIAM E. SCHUYLER, JR.
Attesting Officer                                                    Commissioner of Patents